Aug. 8, 1939.  W. THOMAS  2,168,658
POWER TRANSMISSION PUMP OR MOTOR
Filed Dec. 24, 1936   2 Sheets-Sheet 1

INVENTOR
WILLIAM THOMAS
BY
Ralph L. Tweedale
ATTORNEY

Aug. 8, 1939.     W. THOMAS     2,168,658
POWER TRANSMISSION PUMP OR MOTOR
Filed Dec. 24, 1936     2 Sheets-Sheet 2

INVENTOR
WILLIAM THOMAS
BY
Ralph L. Tweedale
ATTORNEY

Patented Aug. 8, 1939

2,168,658

UNITED STATES PATENT OFFICE 2,168,658

POWER TRANSMISSION PUMP OR MOTOR

William Thomas, Waterbury, Conn., assignor to The Waterbury Tool Company, Waterbury, Conn., a corporation of Connecticut Application December 24, 1936, Serial No. 117,632

4 Claims. (Cl. 103—162)

This invention relates to power transmissions and more particularly to those of the type comprising two or more fluid pressure energy translating devices, one of which may function as a pump and another as a fluid motor. In such devices of the type which comprise a revolving cylinder barrel having a plurality of parallel cylinder bores therein within which pistons are reciprocated by a swash plate device, it is customary to provide a rotary valving mechanism which is operated by the rotation of the cylinder barrel itself for the purpose of alternately connecting each cylinder bore with the inlet and outlet passages of the device. Two types of such valves are in general use; one type employing a flat stationary valve plate having a pair of arcuate ports therein with which individual cylinder ports on the cylinder barrel cooperate. The plate type valve may be so constructed that the cylinder barrel is constantly pressed into engagement with the valve plate so that the clearance at the valve is automatically adjusted to take care of variations in oil viscosity and to compensate for wear. This is a distinct advantage and contributes much to the reliability and long life of machines employing a valve of this character. The plate type valve is somewhat difficult to manufacture with the necessary accuracy, particularly in larger size machines and is also difficult to maintain absolutely flat in service particularly when operating at high pressures.

The other type of valve in general use utilizes a cylindrical valving surface wherein either the cylinder barrel or the valve plate has an externally cylindrical portion fitting within a bore in the other member, the necessary ports being formed in the two cylindrical surfaces. This construction is somewhat more readily machined with the necessary accuracy but presents the disadvantages that the valve clearance is fixed so that leakage varies with viscosity and wear and that fluid passages are necessarily devious as compared with the straight passages possible with the plate type valve.

It is an object of the present invention to provide a power transmission of the character referred to wherein a rotary valve is incorporated which retains the advantages of both the flat plate and cylindrical types of valves without the disadvantages of either.

Further objects and advantages of the present invention will be apparent from the following description, reference being had to the accompanying drawings wherein a preferred form of the present invention is clearly shown.

Figure 1:
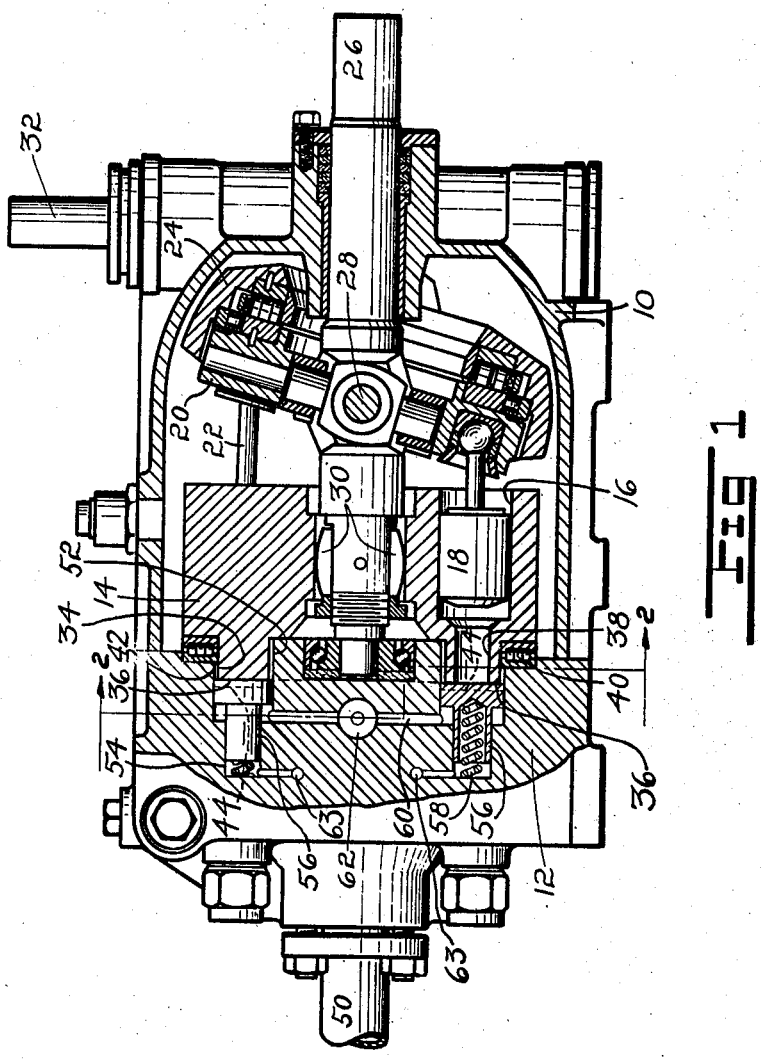
Fig. 1 is a longitudinal cross section of a fluid pressure energy translating device embodying a preferred form of the present invention.

According to the present invention a hydraulic variable speed power transmission may comprise two or more fluid pressure energy translating devices of a construction such as illustrated in the drawings. Except for the valve construction, the device there illustrated is well-known as the "Waterbury" type of variable displacement fluid pump or motor having the usual case 10 closed by a valve plate 12 against which a cylinder barrel 14 abuts. The barrel 14 is provided with a plurality of cylinder bores 16 within which pistons 18 are reciprocated by the motion of a socket ring 20 to which the pistons are connected by ball ended connecting rods 22. The socket ring 20 is journalled in a tilting box 24 mounted on transverse trunnions, not shown. The barrel 14 and socket ring 20 are rotated by a shaft 26 which is connected to the socket ring by a universal joint 28 and to the barrel 14 by keys 30. The inclination of the tilting box relative to the valve plate 12 may be varied by a control shaft 32 which is connected to the tilting box by a suitable operating linkage, not illustrated.

The valve mechanism of the present invention includes an annular projecting portion 34 formed on the end face of barrel 14 and having a flat end face at 36. Each of the cylinders 16 is provided with a cylinder port 38 opening at the face 36. The areas of the cylinders 16, ports 38 and the end face 36 are such as to provide a slight preponderance of fluid pressure force tending to urge the barrel 14 to the left in Fig. 1. A roller thrust bearing 40 takes this force between the cylinder barrel 14 and valve plate 12. The valve plate 12 is provided with an annular groove 42 adapted to receive the projection 34 and having a bottom face at 44, preferably sufficiently spaced from the end face 36 to remain out of contact therewith throughout the normal life of the machine.

Figure 2:
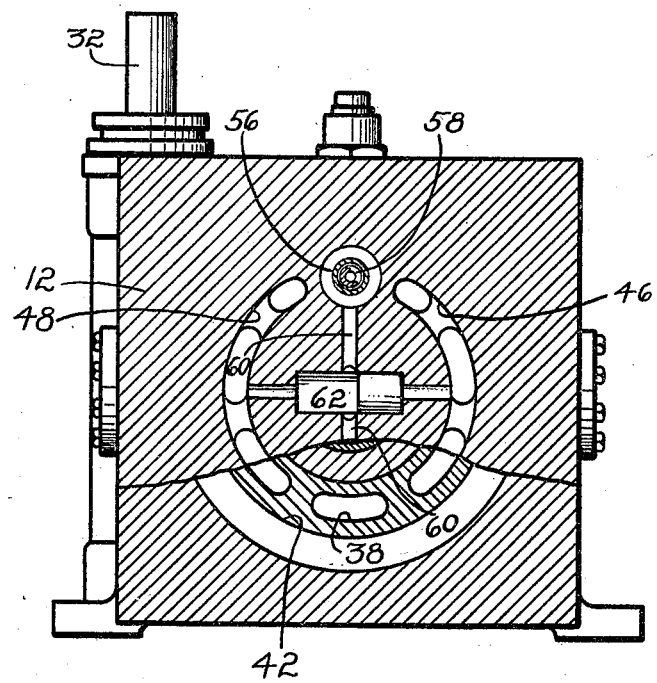
Fig. 2 is a cross section on line 2—2 of Fig. 1.

Communicating with the annular groove 42 are a pair of arcuate valve ports 46 and 48 which lead to inlet and outlet pipe connections indicated at 50. As will be seen from Fig. 2 the valve ports 46 and 48 have their ends spaced apart by approximately the length of one of the cylinder ports 38 so that the bottom 44 of the groove 42 exists only across these bridge portions between the ports 46 and 48. Centrally of these portions at the top and bottom of the valve plate, shouldered bores 52—54 are provided within which are mounted shouldered cylindrical divider blocks 56. The bore portions 52 are preferably slightly greater in diameter than the width of the annular groove 42 while the bore portions 54 may be slightly narrower than the groove 42. Each of the divider blocks 56 has an interior bore within which is mounted a light spring 58 urging the block 56 to the right in Fig. 1 into contact with the end face 36. The left-hand ends of the bore portions 52 communicate by conduits 60 with a shuttle valve 62 adapted to connect the conduits 60 with either the port 46 or the port 48 depending upon which, at any moment, is at the higher pressure. The effective area of the bore 52 is so chosen with respect to the contact area between the end face 36 and the piston 56 as to provide a sufficient preponderance in fluid pressure force to maintain a sealing contact between these members at all times. Suitable drain conduits 63 connect between the inner ends of bores 54 and the interior of casing 10.

In operation, assuming the device to be operating as a pump, the shaft 26 will be rotated by any suitable prime mover and the conduits 50 will be connected to a suitable load device such as a fluid motor. The rotation of the shaft 26 causes rotation of the barrel 14 and the socket ring 20. Each piston 18 is pushed into its cylinder during one half of a revolution and withdrawn during the other half. Each port 38 connects to the delivery port in the valve plate during the pressure stroke of the piston and to the return port during the suction stroke. It will be seen that the two ports 46 and 48, and the cylinder ports 38 which are momentarily in communication with each, are separated from each other by the divider blocks 56. Each port 46—48 is sealed from the other and from the case by a cylindrical seal formed between the cylindrical surfaces of the projection 34 and the groove 42 and by a flat face seal between the divider block 56 and the end face 36. It will be noted that there are no large flat faces which are difficult to machine and to keep flat in service. In addition, the fluid passages are straight, short and direct and involve no sudden changes in direction.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device having a plurality of cylinders and pistons reciprocable therein; a rotary valve structure comprising two relatively rotatable abutting members, one member having an annular projection with cylindrical inner and outer side surfaces and a plane end face, the other member having an annular recess into which said projection is receivable with a running and sealing fit at the inner and outer cylindrical surfaces bounding the annular projection, ports in one member communicating with each of said cylinders, and a pair of inlet and outlet ports in the other member, the ports of one member opening to the ports of the other member at said end face to connect each cylinder alternately with the inlet port and the outlet port.

2. In a fluid pressure energy translating device having a plurality of cylinders and pistons reciprocable therein; a rotary valve structure comprising two relatively rotatable abutting members, one member having an annular projection with cylindrical inner and outer side surfaces and a plane end face, the other member having annular recess into which said projection is receivable with a running and sealing fit at the inner and outer cylindrical surfaces bounding the annular projection, ports in one member communicating with each of said cylinders, a pair of inlet and outlet ports in the other member, the ports of one member opening to the ports of the other member at said end face to connect each cylinder alternately with the inlet port and the outlet port, and means for preventing leakage of fluid between the inlet and outlet ports regardless of clearance at said end face.

3. In a fluid pressure energy translating device having a plurality of cylinders and pistons reciprocable therein; a rotary valve structure comprising two relatively rotatable abutting members, one member having an annular projection with cylindrical inner and outer side surfaces and a plane end face, the other member having an annular recess into which said projection is receivable with a running and sealing fit at the inner and outer cylindrical surfaces bounding the annular projection, ports in one member communicating with each of said cylinders, a pair of inlet and outlet ports in the other member, the ports of one member opening to the ports of the other member at said end face to connect each cylinder alternately with the inlet port and the outlet port, means yieldably associated with said end face for preventing leakage of fluid between the inlet and outlet ports regardless of clearance at said end face, and means for biasing said means into contact with said end face with a force varying with the fluid pressure differential across said inlet and outlet ports.

4. In a fluid pressure energy translating device having a plurality of cylinders and pistons reciprocable therein; a rotary valve structure comprising two relatively rotatable abutting members, one member having an annular projection with cylindrical inner and outer side surfaces and a plane end face, the other member having an annular recess into which said projection is receivable with a running and sealing fit at the inner and outer cylindrical surfaces bounding the annular projection, ports in one member communicating with each of said cylinders, a pair of inlet and outlet ports in the other member, the ports of one member opening to the ports of the other member at said end face to connect each cylinder alternately with the inlet port and the outlet port, means including a divider block yieldably associated with said end face for preventing leakage of fluid between the inlet and outlet ports regardless of clearance at said end face, and means for biasing said means into contact with said end face with a force varying with the fluid pressure differential across said inlet and outlet ports.

WILLIAM THOMAS.